April 9, 1957 L. K. SANDERS ET AL 2,788,193
VEHICLE DOLLY
Filed April 16, 1953 2 Sheets-Sheet 1

Leo K. Sanders
Vaughn A. Sanders
INVENTORS

BY *[signature]*

ATTORNEY

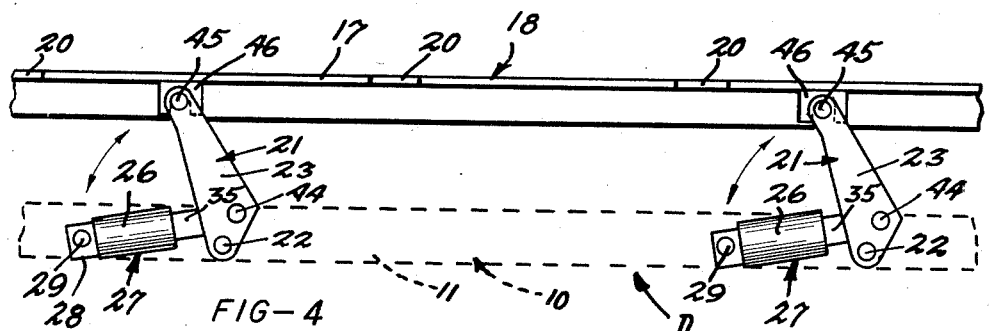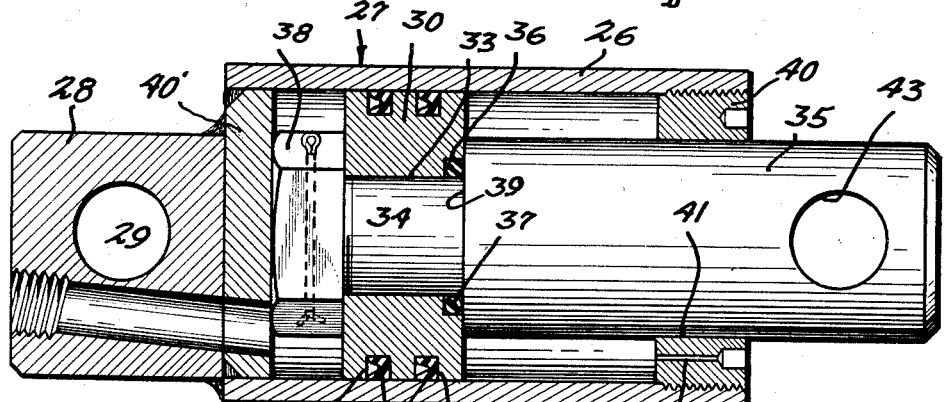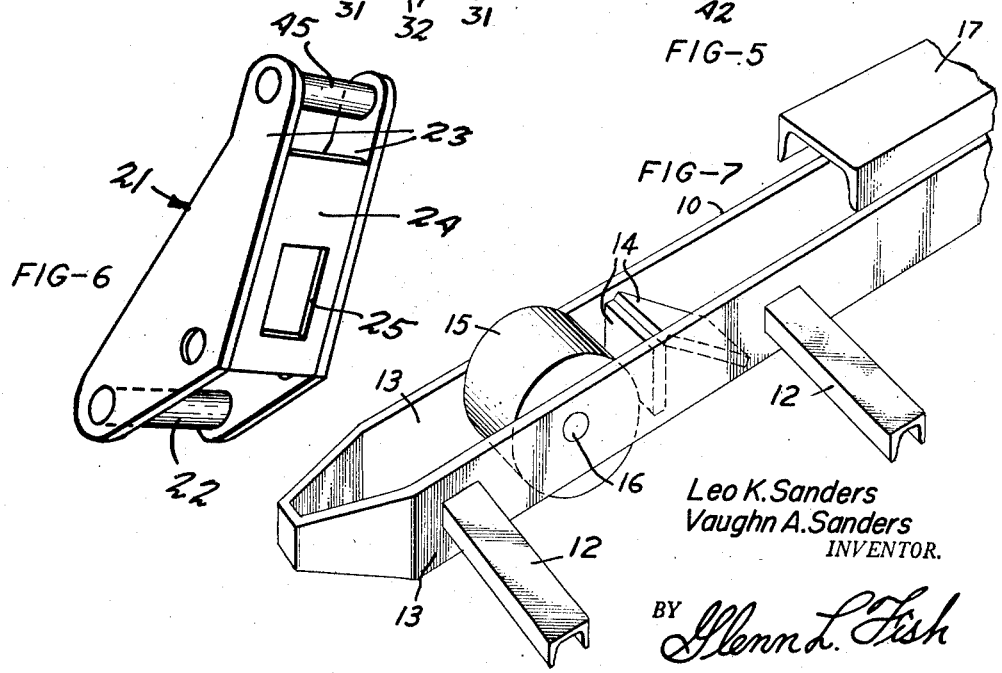

United States Patent Office 2,788,193
Patented Apr. 9, 1957

2,788,193

VEHICLE DOLLY

Leo K. Sanders and Vaughn A. Sanders, Spokane, Wash., assignors to Pigeon Hole Parking, Inc., Spokane, Wash., a corporation of Washington Application April 16, 1953, Serial No. 349,272

1 Claim. (Cl. 254—10)

The present invention relates to a vehicle supporting apparatus and, more particularly, to a vehicle dolly upon the vertically shiftable platform of a mobile vehicle elevator.

One object of the invention lies in the provision of a vehicle dolly on a mobile elevator and which may be mechanically placed beneath a vehicle and the vehicle lifted by a jack frame carried thereon, whereby the dolly may be moved to shift the vehicle.

Another object of the invention lies in the provision of a vehicle dolly on a mobile elevator and which carries a vertically shiftable jack frame which is removably supported on the dolly.

Another object of the invention lies in the provision of a vehicle dolly on a mobile elevator and having a plurality of arms vertically tiltable in planes parallel with the longitudinal axis of the dolly and which releasably support a jack frame for lifting a vehicle.

Another object of the invention lies in the provision of a vehicle dolly on a mobile elevator and having vertically tiltable arms and a jack frame supplied with downwardly opened inverted U-shaped saddles cooperating with the arms whereby the jack frame may be elevated in a horizontal position yet not be secured thereto.

Another object of the invention lies in the provision of a vehicle dolly on a mobile elevator and having a vertically shiftable jack frame releasably carried on vertically pivotal arms pivoted on the dolly and actuated by means of expansion motors independently urged.

These and other objects of the invention will become apparent during the course of the following description.

In the accompanying drawings forming a part of this specification and in which like numerals are used to designate like parts;

Figure 4 is a side elevation showing a pair of expansion motors as associated with their respective arms and showing the jack frame in the elevated position;

Figure 5 is a longitudinal vertical cross section taken through one of the expansion motors;

Figure 6 is a perspective view of one of the vertically tiltable arms; and

Figure 7 is a fragmentary perspective view of one dolly frame end.

Figure 1:
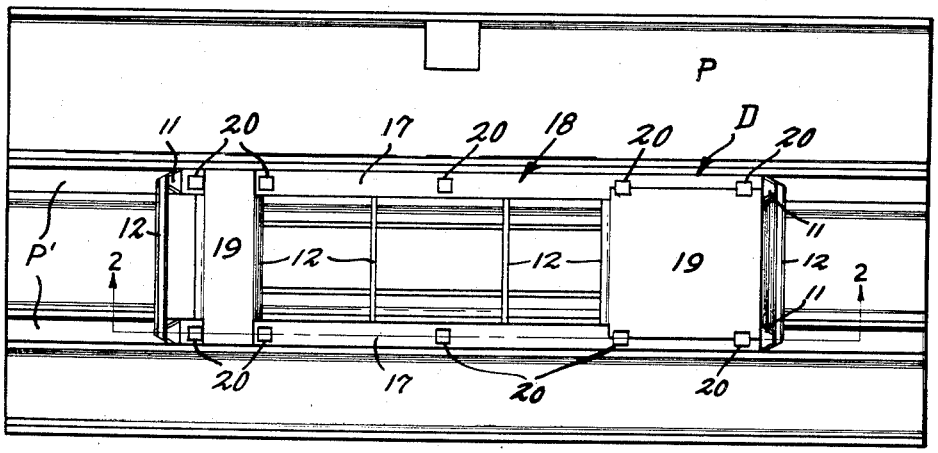
Figure 1 is a plan view of the vertically shiftable platform upon which the dolly is movably supported and shiftable therefrom.

The improved dolly D which comprises the subject matter of the present application has a dolly frame 10 which has a pair of transversely spaced parallel side rails 11 secured in relative position to each other by means of a plurality of transversely extending brace members 12. Each side rail comprises spaced longitudinally extending vertical bars 13 which are united by angular plates 14 welded therebetween. The ends of the side rails taper inwardly to form guiding points for guiding the movements of Dolly D onto the platform P in the recessed tracks P'. Spaced along the lengths of each side rail are wheels 15 carried on axles 16 supported at their ends in the bars 13 of side rails 11, thus the dolly frame is wheeled and adapted for movement onto and off of the platform P.

Figure 2:
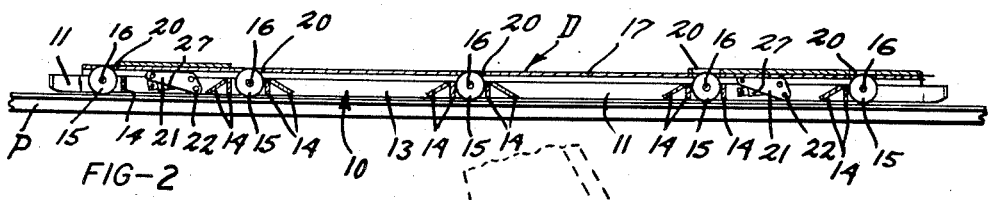
Figure 2 is a longitudinal cross section taken as at lines 2—2 of Figure 1.
Figure 3:
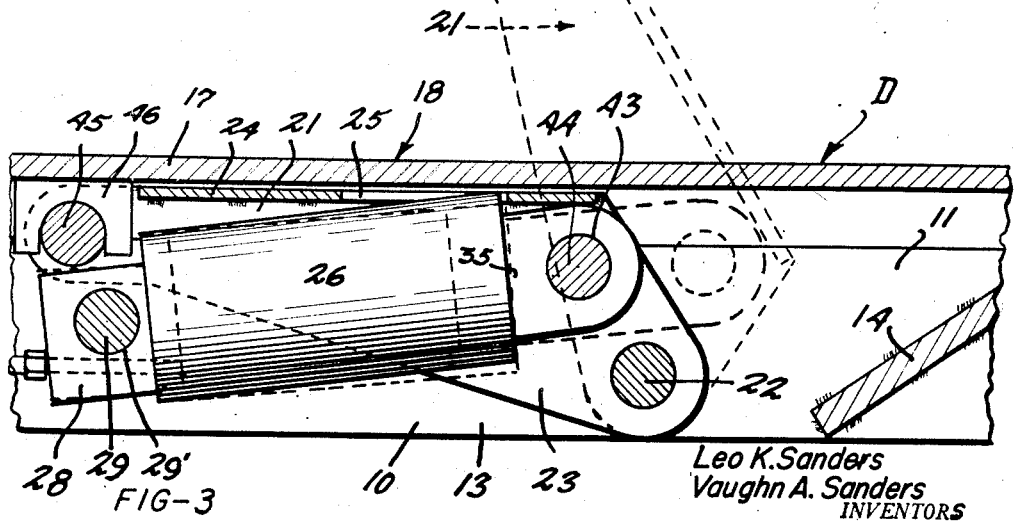
Figure 3 is an enlarged fragmentary vertical cross section showing one of the expansion motors and its cooperating arm and associated parts.

Disposed vertically above the side rails 11 are longitudinally extending side bars 17 which forms a part of a horizontal jack frame 18 vertically movable above the dolly frame. The side bars 17 are formed of channel metal and are united at each end by means of supporting plates 19 secured to the upper face of the side bars 17. As indicated in Figures 2 and 3, the side bars 17 are cut away at 20 to admit the upper portion of the wheels 15 when the jack frame is in a lowered position.

To raise and lower the jack frame, we have provided arms 21 pivoted at their lower ends on transversely extending pins 22, having their ends carried by the bars 13. Each of the arms is substantially triangular in shape when viewed in side elevation and is provided with spaced side plate 23—23 which are united along their upper edges by a back plate 24 secured thereto as by welding. The back plate is provided with a rectangular aperture 25 formed to admit a portion of the expansion motors cylinder, 26.

The expansion motors, indicated in general by the numeral 27 are detailed in Figure 5 and will be seen to comprise a cylinder 26 having a closure plate 40' at its rear end and a block 28 welded to the closure plate. A transverse bore 29' extends through the block 28 and receives journal pin 29 carried at its ends by the bars 13, thus pivotally mounting the expansion motors 27 to the dolly frame 10.

A piston 30 is provided with a pair of annular grooves 31 in which Neoprene gaskets 32 are confined and bear against the inside face of the cylinder 26 and the piston is provided with a central axial bore 33 through which a reduced end portion 34 of the piston rod 35 extends and the piston also is provided with an annular recess 36 at the mouth of the bore 33. A Neoprene gasket 37 is applied in the recess 36 and the nut 38, threaded onto the reduced portion 34, clamps the piston 30 to the shoulder 39 of the connecting rod 35, the gasket 37 is compressed and seals against leakage.

A head 40 is threaded into the forward end of the cylinder 26 and has a central aperture 41 which forms a bearing for the reciprocating piston rod 35. An air vent 42 is formed through the head 40 to permit escape of air as the piston moves outwardly. The outer end of piston rod 35 is provided with a transverse bore 43 and a pin 44 extends through the bore 43 and is carried at its ends in the side plates 23 of the arms 21. The pin 44 is disposed at the obtuse angle of the arms 21 and is offset from a line drawn at right angles to the pin 22 and extending through the axis of transversely extending pin 45 at right angles thereto and located at the free ends of the arms 21, therefore, as the expansion motors 27 drive the piston rod 35 outwardly, the arms 21 are pivoted about their pins 22 and moved to the raised position as shown in Figure 6. It will be noted that pins 45 are adapted to receive downwardly opened, inverted, U-shaped saddles 46 which are secured, as by welding, to the side bars 17 of the jack frame 18.

With the jack frame thus supported, it may be lifted from the dolly without removal of any fastening means to enable one to lubricate and repair the device and also, because the distance between the saddles spaced longitudinally of the jack frame is unchanging, it requires that the arms 21 all pivot simultaneously, therefore maintaining the jack frame in a horizontal position and eliminating the necessity of controlling the movement of the expansion motors 27 as by a fluid metering device or otherwise.

Having thus described our invention, we claim.

In a device of the class described, a movable dolly comprising a frame having a pair of transversely spaced parallel side rails secured in relative position; each said side rail including laterally spaced longitudinally extending vertical bars secured relative to each other by laterally extending plates welded therebetween at intervals spaced longitudinally thereof; wheels disposed intermediate said bars and journaled thereon at intervals spaced along said side rails for supporting and mobilizing said dolly; a horizontal jack frame substantially coextensive with said first named frame and disposed thereabove for vertical movement with relation thereto; said jack frame having cutaway portions to admit said wheels when in its lowermost position; arms pivoted on said first named frame for vertical tilting movement in parallel planes; downwardly open U-shaped transversely elongated saddles secured to the underside of the jack frame; transverse pins carried by the free ends of said arms and disposed in said saddles to raise said jack frame in a horizontal plane as said arms are tilted upwardly; and hydraulic servo-motors pivoted on said first named frame intermediate said vertical bars and pivotally connected one to each said arm intermediate its pivotal connection to said frame and its free end whereby said jack frame is maintained in a horizontal plane during vertical movements by means of said U-shaped saddles and cooperating pins.

References Cited in the file of this patent

UNITED STATES PATENTS

| | | |
|---|---|---|
| 1,239,640 | Trambley | Sept. 11, 1917 |
| 2,213,285 | Nilson | Sept. 3, 1940 |
| 2,245,417 | Schlarmann | June 10, 1940 |
| 2,351,846 | Swim et al. | June 20, 1944 |
| 2,402,579 | Ross | June 25, 1946 |
| 2,555,233 | Hastings | May 29, 1951 |
| 2,626,065 | Sanders et al. | Jan. 20, 1953 |
| 2,629,582 | Stephenson et al. | Feb. 24, 1953 |